(12) United States Patent
Rouffet et al.

(10) Patent No.: US 7,844,271 B2
(45) Date of Patent: Nov. 30, 2010

(54) METHOD FOR SELECTING ONE OF A PLURALITY OF RADIO INTERFACES OF A MOBILE RADIO TELECOMMUNICATION TERMINAL

(75) Inventors: Denis Rouffet, Boulogne Billancourt (FR); Herve Maillard, Igny (FR)

(73) Assignee: Alcatel, Paris (FR)

( * ) Notice: Subject to any disclaimer, the term of this patent is extended or adjusted under 35 U.S.C. 154(b) by 344 days.

(21) Appl. No.: 10/873,287

(22) Filed: Jun. 23, 2004

(65) Prior Publication Data

US 2005/0009530 A1  Jan. 13, 2005

(30) Foreign Application Priority Data

Jul. 10, 2003  (EP) .................................. 03291720

(51) Int. Cl.
*H04W 36/00* (2009.01)
*H04W 4/00* (2009.01)

(52) U.S. Cl. .................... 455/436; 455/437; 455/432.1; 455/438; 370/331; 370/333

(58) Field of Classification Search ............. 455/452.1, 455/410, 552.1, 553.1, 550.1, 450, 455, 432.1–433, 455/550, 452, 552, 525
See application file for complete search history.

(56) References Cited

U.S. PATENT DOCUMENTS

| 5,701,585 | A | 12/1997 | Kallin et al. |
| 6,400,961 | B1 | 6/2002 | Lillie et al. |
| 6,510,146 | B1 * | 1/2003 | Korpela et al. ............... 370/332 |
| 7,562,393 | B2 * | 7/2009 | Buddhikot et al. ............ 726/26 |
| 2001/0036835 | A1 * | 11/2001 | Leedom, Jr. ................. 455/509 |
| 2002/0087674 | A1 * | 7/2002 | Guilford et al. ............. 709/223 |
| 2003/0193910 | A1 * | 10/2003 | Shoaib et al. ............... 370/331 |
| 2004/0185856 | A1 * | 9/2004 | McKenna et al. ........... 455/445 |

FOREIGN PATENT DOCUMENTS

| EP | 0 793 395 A2 | 9/1997 |
| EP | 0 858 237 A2 | 8/1998 |
| EP | 0 888 026 A2 | 12/1998 |

* cited by examiner

*Primary Examiner*—Charles N Appiah
*Assistant Examiner*—Emem Stephen
(74) *Attorney, Agent, or Firm*—Sughrue Mion, PLLC

(57) ABSTRACT

The invention refers to a method for establishing a radio connection (4, 5) for transmitting and receiving data across one of a plurality of radio interfaces (2, 3) of a mobile radio telecommunication terminal (1). The multiple radio interfaces (2, 3) serve for data transmission and reception across radio connections (4, 5) according to various radio protocols within different sub-radio access networks (9, 10). The coverage of sub-radio access networks (9, 10) is determined and the radio connection (4, 5) is established across at least one of the available sub-radio access networks (9, 10). In order to establish a radio connection (4, 5) for transmitting and receiving data across one of the plurality of radio interfaces (2, 3) of the mobile radio telecommunication terminal (1) more efficiently without waste of energy and waste of bandwidth on the radio connections (4, 5) the necessity for a determination of sub-radio access network (9, 10) coverage is established and coverage of the sub-radio access networks (9, 10) is determined only if determination of sub-radio access network (9, 10) coverage is deemed to be necessary.

21 Claims, 2 Drawing Sheets

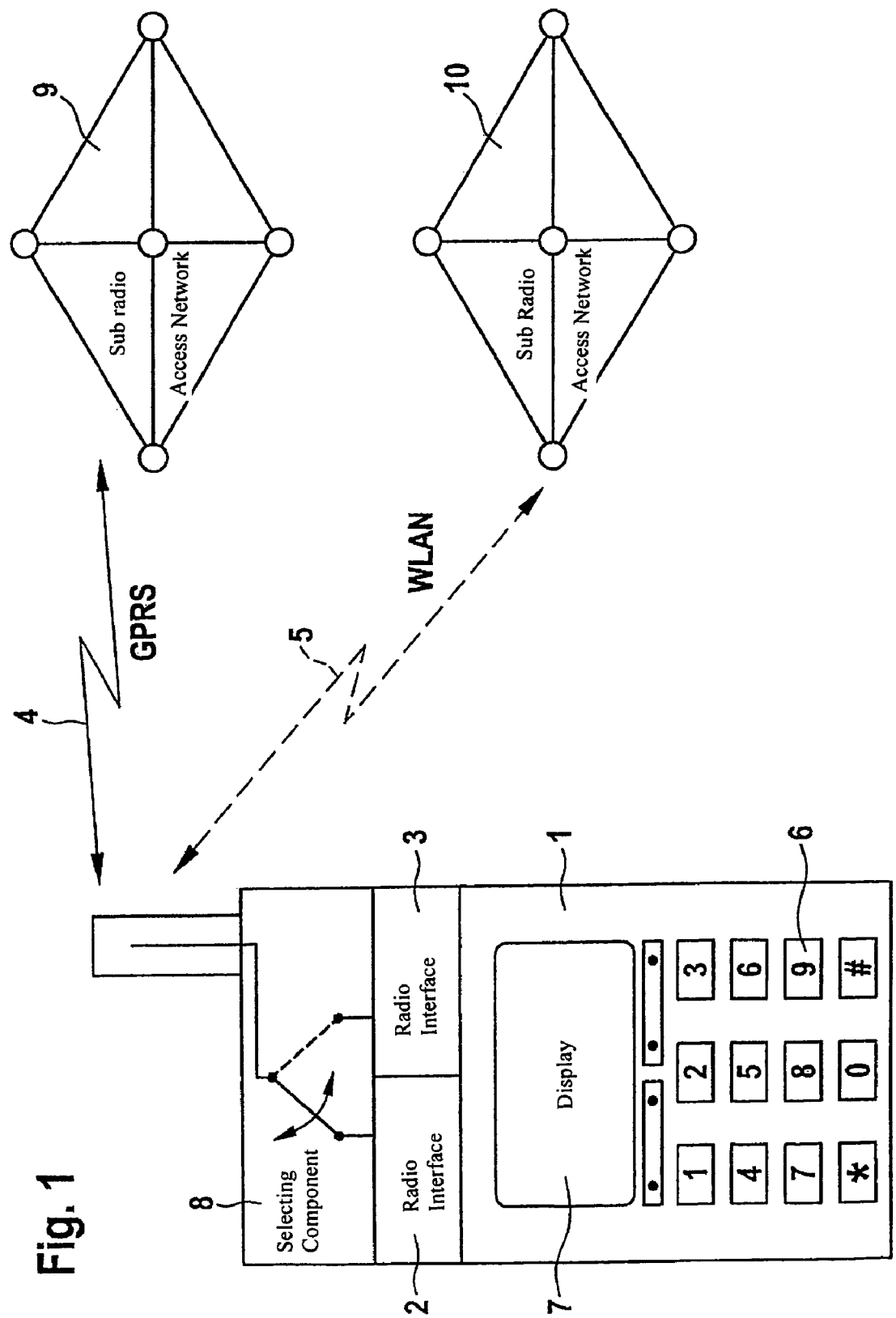

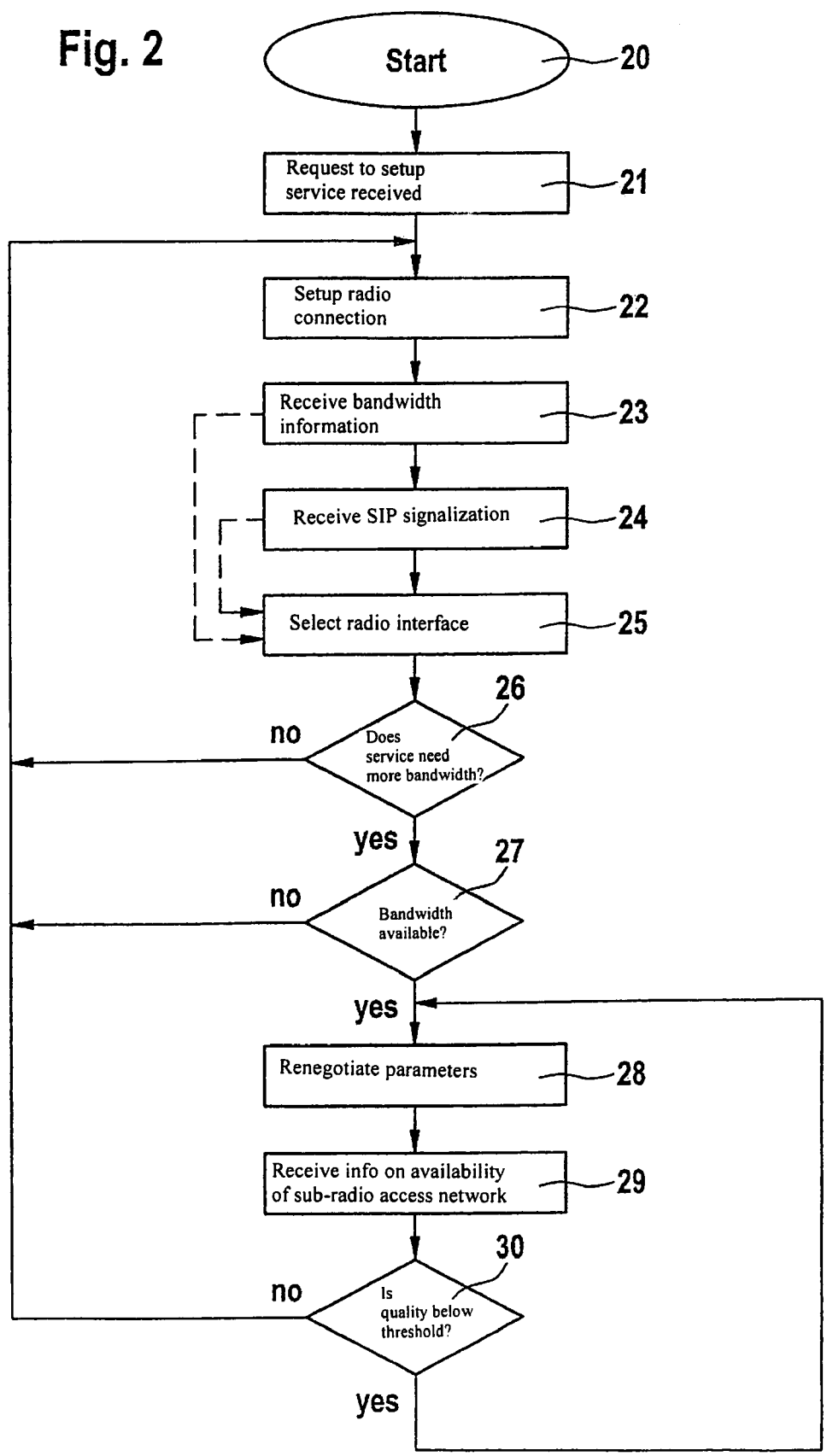

METHOD FOR SELECTING ONE OF A PLURALITY OF RADIO INTERFACES OF A MOBILE RADIO TELECOMMUNICATION TERMINAL

The invention is based on a priority application EP 03 291 720.5 which is hereby incorporated by reference.

FIELD OF THE INVENTION

The present invention refers to a mobile radio telecommunication terminal comprising multiple radio interfaces dedicated for transmitting and receiving data across radio connections according to various radio protocols. The telecommunication terminal further comprises means for detecting sub-radio access networks dedicated for transmitting and receiving data according to the various radio protocols. Furthermore, the telecommunication terminal comprises means for connecting to at least one of the available sub-radio access networks thereby establishing at least one radio connection.

Further, the present invention refers to a method for establishing a radio connection for transmitting and receiving data across one of a plurality of radio interfaces of a mobile radio telecommunication terminal. The multiple radio interfaces serve for data transmission and reception across radio connections according to various radio protocols within different sub-radio access networks. According to the method, the sub-radio access networks are detected and the telecommunication terminal is connected to at least one of the available sub-radio access networks thereby establishing at least one radio connection.

BACKGROUND OF THE INVENTION

Mobile radio telecommunication terminals comprising two or more radio interfaces for establishing radio connections according to different radio protocols are known in the art. The radio interfaces, for example, are dedicated for establishing radio connections according to a WLAN (Wireless Local Area Network)—, a 2G ($2^{nd}$ Generation, e.g. GSM, Global System for Mobile Communication)—, 2.5G (2.5 Generation; e. g. GPRS, General Packet Radio Service)—, 3G ($3^{rd}$ Generation; e.g. UMTS, Universal Mobile Telecommunications System) and further generation data transmission protocols. In order to access a certain radio service, the radio interfaces establish a radio connection to an access network comprising various sub-radio access networks according to the various radio protocols. For example, an access network may comprise both WLAN sub-radio access networks and cellular (2.5G or 3G) sub-radio access networks. While the WLAN sub-radio access networks offer a high bandwidth but only a limited local availability, the cellular sub-radio access network provides moderate bandwidth on an almost full-scale local coverage. The sub-radio access networks interoperate with each other in order to make mobility from one sub-radio access network to another possible, providing at least session continuity.

The mobile radio telecommunication terminal comprising multiple radio interfaces is provided with means for selecting one of the radio interfaces for establishing a radio connection for data transmission and reception. Looking at the state of the art, known telecommunication terminals select, by default, the radio interface assigned to a sub-radio access network of the best, preferably global, coverage. In the above example, the telecommunication terminal would connect to the radio interface assigned to the cellular sub-radio access network. Periodically, the telecommunication terminal scans the WLAN environment in order to detect whether the WLAN sub-radio access network is available. When a WLAN sub-radio access network is available, i.e. the available quality of data transmission and reception across the WLAN sub-radio access network is above a certain quality-level, the telecommunication terminal would select the WLAN radio interface and connect to the WLAN sub-radio access network, deselecting the cellular radio interface and leaving the cellular sub-radio access network. When the WLAN sub-radio access network is no longer available, i.e. the available quality of data transmission and reception across the WLAN radio connection falls below a certain quality-level, the telecommunication terminal would change from the WLAN radio interface back to the cellular radio interface.

The known method for establishing a radio connection for transmitting and receiving data across one of a plurality of radio interfaces of a mobile radio telecommunication terminal depends only on the local availability of the sub-radio access networks and does not take into consideration other factors such as the bandwidth available on the radio connections comprising the various radio interfaces or such as the bandwidth desired for a certain radio service. Further, a heavy drawback of the known method is the fact that it is very energy-inefficient, because the telecommunication terminal scans the network environment periodically in order to detect the sub-radio access networks of the network environment.

Therefore, it is an object of the present invention to establish a radio connection for transmitting and receiving data across one of a plurality of radio interfaces of a mobile radio telecommunication terminal more efficiently without waste of energy and waste of bandwidth on the radio connections.

SUMMARY OF THE INVENTION

To solve this object, a mobile radio telecommunication terminal of the above-mentioned kind is suggested, which comprises means for establishing whether the process of detecting sub-radio access networks and possibly connecting to the at least one available sub-radio access network is necessary, and that the means for detecting sub-radio access networks are activated only if the process of detecting and possibly connecting to the at least one sub-radio access network is deemed to be necessary.

A major aspect of the present invention is the fact, that the telecommunication terminal does not scan the network environment periodically but rather only when necessary. By scanning the network environment the availability of the various sub-radio access networks is determined. With other words, the available sub-radio access networks are detected. Thereafter, if more than one sub-radio access network is available, a suitable sub-radio access network is selected by selecting the appropriate radio interface of the telecommunication terminal. The terminal is connected to the selected sub-radio access network across the selected radio interface thereby establishing a radio connection assigned thereto. The necessity for scanning the network environment can occur in numerous situations. However, in average the network environment is scanned less often than in the known telecommunication terminals and, therefore, works very energy efficient.

According to a preferred embodiment of the present invention it is suggested that the telecommunication terminal comprises means for selecting a radio connection of those available to be used for transmitting and receiving data. A radio connection is selected by selecting the radio interface assigned thereto. The selection of a suitable radio connection for a given radio service can be influenced by a number of variables, parameters or features of the available radio connections or of the radio service currently active. These are, for instance, the bandwidth, the quality of service, mobility features, handover and quality of handover, etc.

Mobility features are for example the maximum relative speed between the emitter and the receiver of a communication system. Depending on the transmission technique used for the radio connection, there is a certain speed limit, above which a Doppler effect may occur which cannot be corrected. For instance, in GSM/GPRS the maximum speed limit for a user is about 250 km/h. In WLAN, the speed limit is lower. Other mobility features are whether handover between two base stations is possible or not, and if it is possible, the quality of the handover (duration of the traffic interruption). These mobility features can be used as a criterion to select a well suited interface for a given radio service. Conversational radio services require a sub-radio access network which supports seamless handover (traffic interruption during handover shorter than a few ms).

According to the present invention "detecting" is used in the sense of detecting the presence of radio beacons of the sub-radio access networks available. "Connecting" is used in the sense of establishing a radio connection and enabling potential data transfers over the radio access network (for WLAN: AAA (authentication, authorization and accounting) processes, IP configuration retrieval; for GPRS: attach, PDP (packet data protocol) context activation). "Selecting" is used in the sense of selecting among several connected radio access networks the one to be used for data transfer.

It is suggested that detecting sub-radio access networks and possibly connecting to the at least one sub-radio access network is deemed to be necessary if a bandwidth desired for the data transmission or reception is higher than a bandwidth available on a radio connection currently active. Furthermore, it is suggested that detecting sub-radio access networks and possibly connecting to the at least one sub-radio access network is deemed to be necessary if an available quality of data transmission and reception across a radio connection currently active is below a certain quality level. Moreover, it is suggested that detecting sub-radio access networks and possibly connecting to the at least one sub-radio access network is deemed to be necessary if an available level of security for data transmission and reception across a radio connection currently active is below a certain security level. Finally, it is suggested that detecting sub-radio access networks and possibly connecting to the at least one sub-radio access network is deemed to be necessary if mobility features offered by a radio connection currently active is below a certain level of requirement. These are just some preferred examples for situations during which scanning the network environment can be necessary. Of course, many other situations are possible, too.

The mobile radio telecommunication terminal selects one of the radio interfaces for data transmission and reception across a radio connection according to the radio protocol assigned to the radio interface taking into consideration, besides other possible variables, parameters or features, the desired bandwidth for the data transmission or reception. If only speech data is transmitted, a lower bit rate may be sufficient. However, if video and audio data are transmitted together, for example for watching a video on the telecommunication terminal or for realizing a visual telephone conversation, much higher bit rates may be necessary. According to the present invention a radio interface enabling higher bit rates is only selected if the radio service currently in use actually desires or needs a higher bandwidth. Furthermore, the radio interface is selected taking into consideration the bandwidth currently available on at least one of the radio connections according to the assigned radio protocols. Preferably, the telecommunication terminal is provided with information concerning the currently available bandwidth of all of the radio connections which could possibly be established by means of the plurality of radio interfaces of the telecommunication terminal. According to the bandwidth actually available, the telecommunication terminal selects that radio interface which offers at least the desired bandwidth.

The mobile radio telecommunication terminal according to the present invention allows a significant energy saving in idle mode (with no data transmission sessions ongoing), since the available sub-radio access networks currently not in use are not continuously scanned to determine sub-radio access network coverage. Furthermore, the resources available for data transmission and reception are assigned to radio services very efficiently because radio services are established across radio connections offering a bandwidth near or corresponding to the bandwidth desired by the radio service.

According to a preferred embodiment of the present invention it is suggested that detecting sub-radio access networks, possibly connecting to and eventually selecting the at least one available sub-radio access network is executed periodically if an ongoing radio service could be enhanced in terms of bandwidth, quality, security and/or mobility features.

Preferably, the telecommunication terminal comprises means for establishing the radio connection for transmitting or receiving data by means of a call control function containing information on the bandwidth desired for the data transmission or reception. According to this embodiment, the telecommunication terminal is supplied with information on the bandwidth desired for the data transmission or reception by means of the call control function, in particular by the signaling of the call control function.

According to another preferred embodiment of the present invention it is suggested that the telecommunication terminal comprises means for establishing a radio connection for transmitting or receiving data by means of a call control function containing information on the bandwidth currently available on at least one of the radio connections according to the assigned radio protocols. Preferably, the call control function supplies the telecommunication terminal with information on the available bandwidth of all of the radio connections according to the assigned radio protocols. The telecommunication terminal then can select a radio interface assigned to that radio connection which offers the desired bandwidth. Preferably, the information on the currently available bandwidth is transmitted within the signaling information of the call control function.

Of course, any other type of call control function may be used for setting up a radio service and for transmitting information on the desired bandwidth and the available bandwidth to the telecommunication terminal. It is suggested that the means for establishing a radio connection establish the radio connection by means of a SIP (Session Initiation Protocol) call control function. Alternatively, it is suggested that the means for establishing a radio connection establish the radio connection by means of a H.323 call control function.

According to yet another preferred embodiment of the present invention it is suggested that the means for selecting one of the radio interfaces when setting up a new radio service across a radio connection first by default select the radio interface with the lowest bandwidth available on the radio connection assigned to the radio interface.

Preferably, the means for selecting one of the radio interfaces change from a first of the radio interfaces to a further of the radio interfaces if the bandwidth available on the radio connection comprising the further radio interface is higher than the bandwidth available on the radio connection comprising the first radio interface. Additionally, it is possible to restrict the change from the first radio interface to the further radio interface to those cases, in which the current radio services desire or need a bandwidth higher than the bandwidth currently available on the radio connection comprising the first radio interface.

According to yet another preferred embodiment of the present invention it is suggested that the means for selecting one of the radio interfaces for transmitting data across a radio connection select the one radio interface according to an available quality of data transmission and reception across the radio connection assigned to the radio interface. If the quality of the data transmission and reception is above a certain quality level, the sub-radio access network environment is deemed to be available. If the quality is below a certain quality level, the sub-radio access network environment is deemed to be not available.

Preferably, the means for selecting one of the radio interfaces for transmitting data across a radio connection change from a first of the radio interfaces to a further of the radio interfaces if the available quality of data transmission and reception across a radio connection comprising the further radio interface is better than the available quality of data transmission and reception across a radio connection comprising the first radio interface.

Furthermore, the object of the present invention is solved by a method of the above-mentioned characterized in that the necessity for determination of sub-radio access network coverage is established and coverage of sub-radio access networks is determined only if detection of sub-radio access network coverage is deemed to be necessary.

BRIEF DESCRIPTION OF THE DRAWINGS

Preferred embodiments of the present invention can be taken from the enclosed drawings and the following description of the drawings. All features described in the drawings, the description and the claims are part of the present invention. The Figures show:

FIG. 1. A radio network environment for execution of the method according to the present invention; and FIG. 2. a flow chart of the method according to the present invention in a preferred embodiment.

DETAILED DESCRIPTION OF THE INVENTION

In FIG. 1 a mobile radio telecommunication terminal is designated with reference sign 1. The telecommunication terminal 1 is a mobile phone. Of course, the telecommunication terminal 1 could be a smart phone or any kind of computer (palmtop, PDA (Personal Digital Assistant) or personal computer) equipped with the appropriate hardware and software for effecting data transmission and data reception according to a certain radio protocol, too. The telecommunication terminal 1 comprises two radio interfaces 2, 3 dedicated for transmitting and receiving data across radio connections 4, 5 according to different radio protocols. For example, radio interface 2 is dedicated for transmitting and receiving data across the radio connection 4 according to a GPRS-protocol. The other radio interface 3 is dedicated for transmitting and receiving data across the second radio connection 5 according to a WLAN-protocol.

Furthermore, the telecommunication terminal 1 comprises input means 6 which in the present embodiment is a conventional key pad. Of course, the input means 6 can also be a touchscreen etc. Further, the telecommunication terminal 1 comprises a display 7 for displaying information on the current status of the telecommunication terminal 1 and of the current radio communication. The display 7 can be any kind of display. Preferably, it is an LCD (Liquid Crystal Display) or a plasma display.

A user of the mobile radio telecommunication terminal 1, for example, has a subscription to a mobile operator, which deploys an IMS (IP Multimedia Sub-system). In order to access the IMS services, an access network is used, which is composed of both a cellular (GPRS) sub-radio access network 9 providing a moderate bandwidth but an almost full-scale local coverage and a WLAN sub-radio access network 10 offering a high bandwidth but only a limited local availability, i.e. coverage only in limited areas. The sub-radio access networks 9, 10 interoperate with each other in the sense that mobility from one sub-radio access network to another is possible with at least continuity of the current session.

An issue for the telecommunication terminal 1 is to select the best adapted radio interfaces 2, 3 depending on its needs of throughput and depending on the regional coverage and availability of the sub-radio access network assigned to the radio interface.

According to the present invention, the telecommunication terminal 1 comprises means 8 for selecting one of the radio interfaces 2, 3 for transmitting or receiving data across a desired radio connection 4, 5. Furthermore, the telecommunication terminal 1 comprises means for determining the sub-radio access network 9, 10 coverage by scanning the network environment, i.e. for detecting the sub-radio access networks 9, 10. Further, the telecommunication terminal 1 comprises means for establishing a radio connection 4, 5. For establishing a radio connection 4, 5 the telecommunication terminal 1 has to get connected with the sub-radio access network 9, 10 and to perform so called AAA (authentication, authorization and accounting) processes and to retrieve routing parameters. Finally, the telecommunication terminal 1 comprises means for establishing the necessity for scanning the network environment and for detecting sub-radio access networks 9, 10. The means 8 can switch between the first radio interface 2 and the second radio interface 3 and establish radio connections 4, 5 across the radio interfaces 2, 3 to the different sub-radio access networks 9, 10.

The availability of the sub-radio access networks 9, 10 is not determined periodically, but rather only when necessary. If the means for determining the necessity of scanning the network environment, such a scan is effected. Scanning the network environment may be necessary when the quality of transmission and reception of the radio connection 4 currently active falls below a certain quality-level. Further, scanning the network environment may be necessary if a higher bandwidth is requested or needed by the active radio service than die radio connection currently active can offer. Further, the necessity may arise during set up of a new radio service across a radio connection. After scanning the network environment, the sub-radio access networks 9, 10 currently available are known to the telecommunication terminal 1 and the means 8 for selecting the radio interfaces 2, 3 can select that interface 2, 3 associated with the available sub-radio access network 9, 10 and the desired radio connection 4, 5 if more than one sub-radio access network 9, 10 is available.

With other words, the means 8 for selecting one of the radio interfaces 2, 3 receive information on the bandwidth desired by the current radio service and on the bandwidth available on the sub-radio access networks 9, 10. According to this information received, the means 8 switch between the first radio interface 2 and the second radio interface 3 in order to transmit or receive data across the GPRS radio connection 4 or the WLAN radio connection 5.

For example, the mobile radio telecommunication terminal 1 connects by default to the cellular (GPRS) radio interface 2. When a radio service is being set up, and in situations when this radio service requires a higher bandwidth, the telecommunication terminal 1 attempts to detect a WLAN sub-radio access network 10 and to connect to a WLAN radio interface 3. If, however, the bandwidth of the radio interface 2 currently in use is sufficient, the telecommunication terminal 1 does not look for other sub-radio access networks because there is no necessity. This is what happens during service delivery.

One possible method for realization of the present invention is a SIP (Session Initiation Protocol) call control function, upon which all applications and services the user of the telecommunication terminal 1 consumes rely upon. When the telecommunication terminal 1 initiates or receives a multimedia call (for example voice data, a combination of video and audio data, streaming etc.) to or from another telecommunication terminal or to or from an IMS service platform, during setup of the radio connections 4, 5, SIP signalization is emitted or received by the telecommunication terminal 1. The SIP signalization contains information regarding a bandwidth required by the multimedia IMS session which is being set up and regarding a bandwidth currently available on the sub-radio access networks 9, 10. The SIP signaling is transmitted to the or from the telecommunication terminal 1 across the radio interface 2, 3 currently selected. A main issue of the present invention to make the session layer of the telecommunication terminal 1 interoperate with a module within the terminal 1 for determining WLAN coverage and triggering handover.

The mobile radio telecommunication terminal 1 attempts to connect the WLAN sub-radio access network 10 if resources available in the cellular GPRS sub-radio access network 9 are not sufficient compared with the needs of the current radio service described in the SIP signaling. In that case a scan of the network environment is deemed necessary by the appropriate means. Then the sub-radio access network 9, 10 coverage is determined by the appropriate means. After that one of the radio interfaces 2, 3 is selected by the means 8. Finally, a radio communication 4, 5 is established across the selected radio interface 2, 3 by appropriate means.

During a radio session, if the radio service quality, that is the available quality of the data transmission or reception, is low at the initialization of a session, the telecommunication terminal 1 periodically determines the availability of the WLAN sub-radio access network 10. If the available quality of data transmission across the WLAN radio connection 5 exceeds a desired quality level, that is if the WLAN sub-radio access network 10 coverage is found out to be sufficient, the telecommunication terminal 1 connects to the WLAN sub-radio access network 10 across the WLAN radio interface 3 and triggers SIP signaling in order to renegotiate multimedia session parameters.

If WLAN coverage is lost during the radio session, the cellular (GPRS) interface 3 is connected by the telecommunication terminal 1, and the multimedia session parameters are renegotiated with the sub-radio access network 9.

In the present embodiment the telecommunication terminal is provided with a GPRS radio interface 2 and a WLAN radio interface 3. However, the present invention can be realized with any kind of radio interface as long as the various radio interfaces have only a regional coverage. The present invention is particularly advantageous if one radio interface offers a high bandwidth and only a restricted regional coverage and the other interface offers only a moderate bandwidth but a full-scale, preferably global, coverage. Similarly, the invention works not only with SIP call control function but also with a H.323 call control function or any other kind of call control function as long as the call control function has a possibility for transmitting information concerning the desired bandwidth and the available bandwidth. Finally, the IMS service was mentioned as an example. Of course, the present invention works with any kind of radio service to be established across one of the radio connections 4, 5.

FIG. 2 shows a flowchart of a method according to the present invention in a preferred embodiment. The method begins in a functional block 20. In a functional block 21 a request for setting up an IMS service is received by the telecommunication terminal 1 from an IMS service platform or is received by the IMS service platform from a telecommunication terminal 1. To begin with, by default, the telecommunication terminal 1 sets up a GPRS radio connection 4 by means of the GPRS radio interface 2 (see functional block 22). The IMS service is set up by means of a SIP call control function. The SIP signalization contains information regarding the bandwidth desired by the IMS service for data transmission or reception.

In functional block 23 this information concerning the desired bandwidth is received by the telecommunication terminal 1. Furthermore, the SIP signalization contains information regarding the bandwidth available on at least one, and preferably all of the radio connections 4, 5. This information is received by the telecommunication terminal 1 in functional block 24.

In functional block 25 the means 8 for selecting a radio interface select one of the interfaces 2, 3 taking into consideration the information concerning the bandwidth received in the functional blocks 23 and 24. In a query block 26 it is determined, whether the IMS service needs or desires a higher bandwidth for data transmission and/or reception than the radio connection 4 currently in use can offer. In other words, in block 26 the means for establishing the necessity for scanning the network environment, determine whether the sub-radio access networks 9, 10 are available. If the IMS service does not need and does not desire a higher bandwidth, there is no need for the telecommunication terminal 1 to change radio interface in order to obtain a higher bandwidth and the data transmission and/or reception continues in functional block 22 across the GPRS radio interface 2 and the radio connection 4 as associated therewith. This means that according to the present invention the network environment is not scanned periodically, but rather only when necessary.

If however, a higher bandwidth is desired in a query block 27 it is determined whether the bandwidth available on the radio connection 5 comprising the WLAN radio interface 3 is higher than the bandwidth available on the radio connection 4 comprising the GPRS radio interface 2. If this is the case and if the bandwidth desired by or necessary for the IMS service is higher than the bandwidth available on the current GPRS radio connection 4 (see query block 26), the network environment is scanned and those sub-radio access networks 9, 10 currently available are determined. If the WLAN sub-radio access network 10 is available, the WLAN radio interface 3 is selected and the WLAN radio connection 5 is established for data transmission and data reception.

When changing from the GPRS radio connection 4 to the WLAN radio connection 5, the IMS parameters have to be renegotiated (see functional block 28). In functional block 29 information is picked up concerning the availability of the WLAN sub-radio access network 10 in the current position of the telecommunication terminal 1. If the quality of data transmission and/or reception across the WLAN radio connection 5 falls below a certain quality-level, it is assumed that the WLAN sub-radio access network 10 is no longer available. This is determined in the query block 30. Yes again, this makes a change of the radio communication 4, 5 and a preceding scan of the network environment necessary.

If the quality of data transmission and reception across the WLAN radio connection 5 is above the quality-level, the method continues in functional block 28, where the data transmission and data reception is continued across the WLAN radio connection 5. However, if the regional coverage of the WLAN sub-radio access network 10 can no longer be determined, the method continues in functional block 22 where the telecommunication terminal 1 switches to data transmission and data reception across the GPRS radio connection 4 by selecting the GPRS radio terminal 2. Before, however, the network environment has to be scanned in order to determine whether the GPRS sub-radio access network 9 is available.

The steps 23 to 27 of the present invention can be repeated from time to time, preferably periodically, during data transmission across the GPRS radio communication 4. Every time these steps are executed, it is determined whether the current radio service, i.e. the IMS service, desires or needs a higher bandwidth and whether the current radio communication 4 can offer the desired bandwidth. If a radio communication 5 with a higher bandwidth is needed for the current radio service, the telecommunication terminal, i.e. the means 8 for selecting the radio interface 2, 3, select the WLAN radio interface 3 and establish a data transmission across the WLAN radio communication 5. If, however, a radio communication with a higher bandwidth can not be found, the actual bandwidth of the data transmission and/or reception has to be adopted to be the bandwidth currently available, i.e. the current bandwidth has to be reduced.

The invention claimed is:

1. A mobile radio telecommunication terminal comprising:
a plurality of radio interfaces dedicated for transmitting and receiving data across radio connections according to various radio protocols; means for detecting sub-radio access networks dedicated for transmitting and receiving data according to the various radio protocols; means for connecting to at least one of the available sub-radio access networks and thereby establishing at least one radio connection; means for determining whether a process of detecting sub-radio access networks and connecting to the at least one available sub-radio access network is necessary; and means for selecting a radio connection of those available to be used for transmitting and receiving data,
wherein the means for detecting sub-radio access networks are activated only if the process of detecting and possibly connecting to the at least one sub-radio access network is determined to be necessary, wherein a criterion to trigger detecting sub-radio access networks, or connecting to the at least one available or selected sub-radio access network consists of bandwidth, quality level, security level and mobility features,
wherein the means for selecting a radio connection comprises means for selecting one of the radio interfaces for transmitting and receiving data across the radio connection of a certain sub-radio access network available, in case more than one sub-radio access network is available, and wherein the means for selecting one of the radio interfaces when setting up a new radio service across a radio connection first by default select the radio interface with the lowest bandwidth available on the radio connection assigned to the radio interface.

2. The mobile radio telecommunication terminal according to claim 1, wherein detecting sub-radio access networks and possibly connecting to the at least one sub-radio access network is deemed to be necessary if a bandwidth desired for the data transmission or reception is higher than a bandwidth available on a radio connection currently active.

3. The mobile radio telecommunication terminal according to claim 1, wherein detecting sub-radio access networks and possibly connecting to the at least one sub-radio access network is deemed to be necessary if an available quality of data transmission and reception across a radio connection currently active is below a certain quality level.

4. The mobile radio telecommunication terminal according to claim 1, wherein detecting sub-radio access networks and possibly connecting to the at least one sub-radio access network is deemed to be necessary if an available level of security for data transmission and reception across a radio connection currently active is below a certain security level.

5. The mobile radio telecommunication terminal according to claim 1, wherein detecting sub-radio access networks and possibly connecting to the at least one sub-radio access network is deemed to be necessary if mobility features offered by a radio connection currently active is below a certain level of requirement.

6. The mobile radio telecommunication terminal according to claim 2, wherein detecting sub-radio access networks and possibly connecting to and eventually selecting the at least one available sub-radio access network is executed periodically if an ongoing radio service could be enhanced in terms of bandwidth, quality, security or mobility features.

7. The mobile radio telecommunication terminal according to claim 1, wherein detecting sub-radio access networks and possibly connecting to the at least one sub-radio access network is deemed to be necessary during set up of a new radio service across a radio connection.

8. The mobile radio telecommunication terminal according to claim 6, wherein the ongoing radio service is a multi-media call, setup by means of a call control function containing information on the bandwidth or the quality level desired for the data transmission or reception.

9. The mobile radio telecommunication terminal according to claim 1, wherein the means for connecting to at least one of the available sub-radio access networks establish a radio connection for transmitting or receiving data by means of a call control function containing information on the bandwidth or the quality level currently on at least one of the radio connections according to the assigned radio protocols.

10. The mobile radio telecommunication terminal according to claim 7, wherein the means for establishing a radio connection use a Session Initiation Protocol or an H.323 call control function to establish the radio connection.

11. The mobile radio telecommunication terminal according to claim 1, wherein the means for selecting one of the radio interfaces, when setting up a new radio service across a radio connection, among the radio interfaces that fit with the radio service requirement in terms of bandwidth, quality of service, mobility features or security by default select the radio interface which is less energy consuming for the telecommunication terminal.

12. The mobile radio telecommunication terminal according claim 1, wherein the means for selecting one of the radio interfaces change from a first of the radio interfaces to a further of the radio interfaces if the bandwidth available on the radio connection comprising the further radio interface is higher than the bandwidth available on the radio connection comprising the first radio interface.

13. The mobile radio telecommunication terminal according to claim 1, wherein the means for selecting one of the radio interfaces for transmitting data across a radio connection select the one radio interface according to an available quality of data transmission and reception across the radio connection assigned to the radio interface.

14. A method for establishing a radio connection for transmitting and receiving data across one of a plurality of radio interfaces of a mobile radio telecommunication terminal, said plurality of radio interfaces serving for data transmission and reception across radio connections according to various radio protocols within different sub-radio access networks, the method comprising: detecting sub-radio access networks; connecting the mobile radio communications terminal to at least one of the available sub-radio access networks and thereby establishing at least one radio connection; selecting a radio connection of those available to be used for transmitting and receiving data; selecting one of the radio interfaces for transmitting and receiving data across the radio connection of a certain sub-radio access network available, in case more than one sub-radio access network is available, wherein the means for detecting sub-radio access networks are activated and the detecting and possibly connecting are performed only if the detecting and connecting is deemed to be necessary, wherein a criterion to trigger detecting sub-radio access networks, or connecting to the at least one available or selected sub-radio access network consists of bandwidth, quality level, security level and mobility features, and wherein the selecting one of the radio interfaces when setting up a new radio service across a radio connection first by default select the radio interface with the lowest bandwidth available on the radio connection assigned to the radio interface.

15. The method according to claim 14, wherein detecting sub-radio access networks and possibly connecting to the at least one sub-radio access network is deemed to be necessary if a bandwidth desired for the data transmission or reception is higher than a bandwidth available on a radio connection currently active.

16. The method according to claim 14, wherein detecting sub-radio access networks and possibly connecting to the at least one sub-radio access network is deemed to be necessary if an available quality of data transmission and reception across a radio connection currently active is below a certain quality level.

17. The method according to claim 14, wherein detecting sub-radio access networks and possibly connecting to the at least one sub-radio access network is deemed to be necessary if an available level of security for data transmission and reception across a radio connection currently active is below a certain security level.

18. The method according to claim 14, wherein detecting sub-radio access networks and possibly connecting to the at least one sub-radio access network is deemed to be necessary if mobility features offered by a radio connection currently active is below a certain level of requirement.

19. The method according to claim 14, wherein detecting sub-radio access networks and possibly connecting to the at least one sub-radio access network is deemed to be necessary during set up of a new radio service across a radio connection.

20. The mobile radio telecommunication terminal according to claim 1, wherein the mobility features comprise a maximum relative speed between a base station and the mobile radio telecommunication terminal.

21. The method according to claim 14, wherein the mobility features comprise a maximum relative speed between a base station and the mobile radio telecommunication terminal.

* * * * *